United States Patent
Zhao

(10) Patent No.: US 9,006,941 B2
(45) Date of Patent: Apr. 14, 2015

(54) PERMANENT MAGNET MOTOR HAVING TEETH WITH FINGERS

(75) Inventor: Steve Zong-Ping Zhao, Woodland Hills, CA (US)

(73) Assignee: Moog Inc., East Aurora, NY (US)

( * ) Notice: Subject to any disclaimer, the term of this patent is extended or adjusted under 35 U.S.C. 154(b) by 65 days.

(21) Appl. No.: 13/061,057

(22) PCT Filed: Aug. 29, 2008

(86) PCT No.: PCT/US2008/010246
§ 371 (c)(1),
(2), (4) Date: Feb. 25, 2011

(87) PCT Pub. No.: WO2010/024793
PCT Pub. Date: Mar. 4, 2010

(65) Prior Publication Data
US 2011/0156506 A1 Jun. 30, 2011

(51) Int. Cl.
*H02K 37/14* (2006.01)
(52) U.S. Cl.
CPC ..................... *H02K 37/14* (2013.01)
(58) Field of Classification Search
CPC ....... H02K 37/04; H02K 37/10; H02K 37/12; H02K 37/14
USPC ............. 310/49.37, 156.59, 156.49, 216.094, 310/216.097, 216.112
IPC ..................... H02K 37/14, 37/04, 37/10, 37/12, H02K 1/27
See application file for complete search history.

(56) References Cited

U.S. PATENT DOCUMENTS

| | | | |
|---|---|---|---|
| 3,428,837 A * | 2/1969 | Morreale et al. | 310/49.37 |
| 4,190,779 A | 2/1980 | Schaeffer | |
| 4,288,709 A | 9/1981 | Matthias | |
| 4,315,171 A | 2/1982 | Schaeffer | |
| 4,712,028 A | 12/1987 | Horber | |
| 4,713,570 A | 12/1987 | Mastromattei | |
| 4,728,830 A | 3/1988 | Gamble | |
| 4,763,034 A | 8/1988 | Gamble | |
| 4,794,286 A | 12/1988 | Taenzer | |

(Continued)

FOREIGN PATENT DOCUMENTS

| | | |
|---|---|---|
| CH | 543829 A | 10/1973 |
| EP | 0385203 | 9/1990 |

(Continued)

OTHER PUBLICATIONS

Machine translation of JP10-080124A (published: Mar. 24, 1998, translated Apr. 29, 2013).*

(Continued)

*Primary Examiner* — Michael Andrews
(74) *Attorney, Agent, or Firm* — Phillips Lytle LLP

(57) ABSTRACT

A permanent magnet-type stepping motor broadly includes: a movable member (e.g., a rotor) having a number of magnetic poles on a surface thereof, with adjacent poles being of opposite polarity, the number of poles being a function of a constant, the number of phases and a desired step interval; and a stationary member (e.g., a stator) having a number of equally-spaced teeth arranged to face toward said movable member surface, each of said teeth having a plurality of fingers arranged to face toward said movable member surface, the number of said teeth being a whole integer that is a function of a constant, the number of said poles, the number of said fingers on each stator tooth, and the number of phases.

15 Claims, 10 Drawing Sheets

(56) References Cited

U.S. PATENT DOCUMENTS

| | | | |
|---|---|---|---|
| 4,857,786 A | | 8/1989 | Nihei |
| 5,128,570 A | * | 7/1992 | Isozaki ............... 310/49.08 |
| 5,386,161 A | * | 1/1995 | Sakamoto ............. 310/49.53 |
| 5,631,512 A | | 5/1997 | Kawabata et al. |
| 5,856,714 A | | 1/1999 | Sugiura |
| 6,051,898 A | | 4/2000 | Sakamoto |
| 6,239,530 B1 | | 5/2001 | Garcia |
| 6,262,508 B1 | | 7/2001 | Shibayama |
| 6,320,347 B1 | | 11/2001 | Sakamoto |
| 6,652,249 B2 | | 11/2003 | Kenney et al. |
| 6,657,353 B1 | | 12/2003 | Patarchi |
| 6,670,732 B2 | * | 12/2003 | Sakamoto ............. 310/49.44 |
| 6,741,006 B2 | * | 5/2004 | Sakamoto ............. 310/254.1 |
| 6,777,842 B2 | | 8/2004 | Horst |
| 7,064,468 B2 | * | 6/2006 | Fujinaka ............. 310/216.114 |
| 7,928,612 B2 | | 4/2011 | Chung et al. |
| 2002/0153792 A1 | | 10/2002 | Isozaki |
| 2004/0251759 A1 | * | 12/2004 | Hirzel ................. 310/156.25 |
| 2005/0040723 A1 | | 2/2005 | Asai et al. |
| 2006/0006744 A1 | * | 1/2006 | Nashiki .................. 310/49 R |
| 2007/0013237 A1 | * | 1/2007 | Badgerow et al. ....... 310/49 R |
| 2009/0009010 A1 | | 1/2009 | Chung et al. |
| 2010/0148612 A1 | | 6/2010 | Takemoto |
| 2010/0259112 A1 | | 10/2010 | Chung et al. |

FOREIGN PATENT DOCUMENTS

| | | | | |
|---|---|---|---|---|
| EP | 0780958 | | 6/1997 | |
| EP | 1517429 | | 3/2005 | |
| JP | 59153457 | | 9/1984 | |
| JP | 60113649 A | | 6/1985 | |
| JP | 61231864 | | 11/1986 | |
| JP | 10080124 A | * | 3/1998 | ............ H02K 37/14 |
| JP | 10-285899 A | | 10/1998 | |
| JP | 2003-219624 A | | 7/2003 | |

OTHER PUBLICATIONS http://www.cs.uiowa.edu/~jones/step/.

* cited by examiner

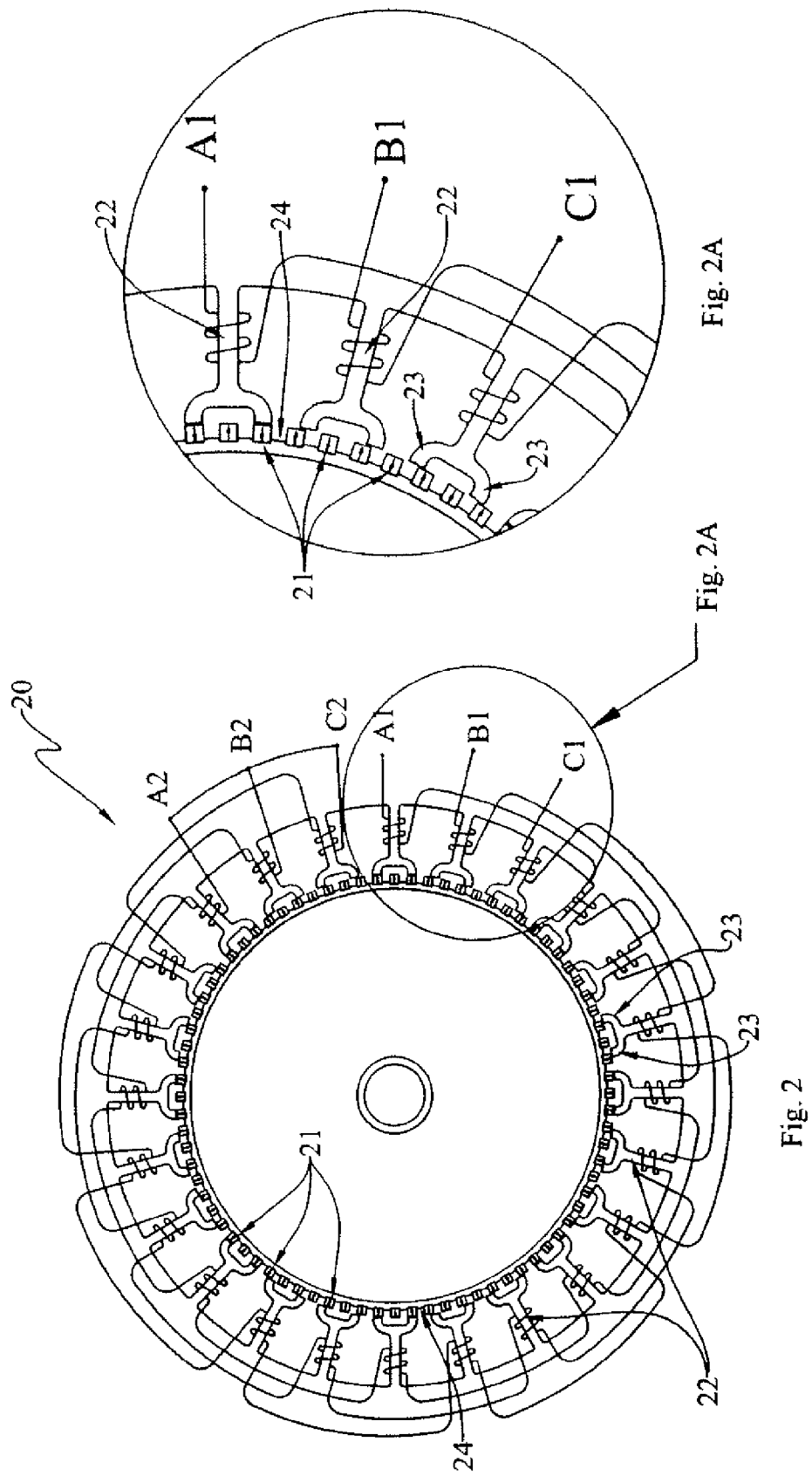

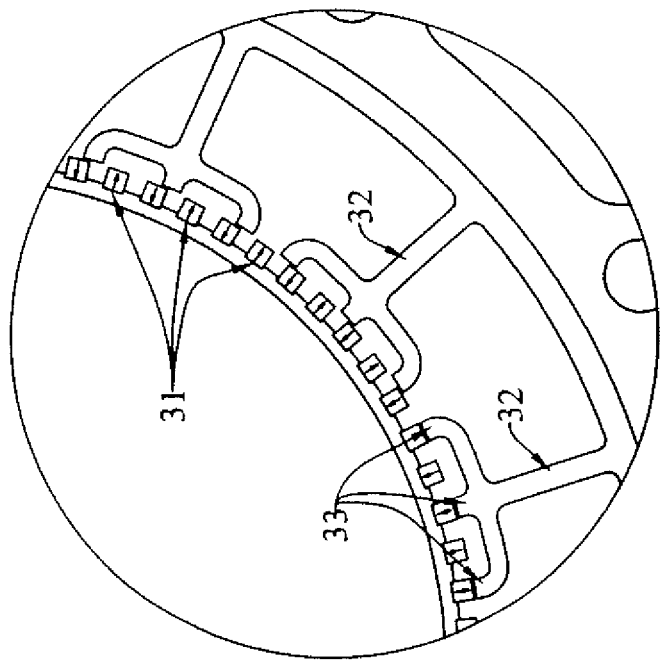
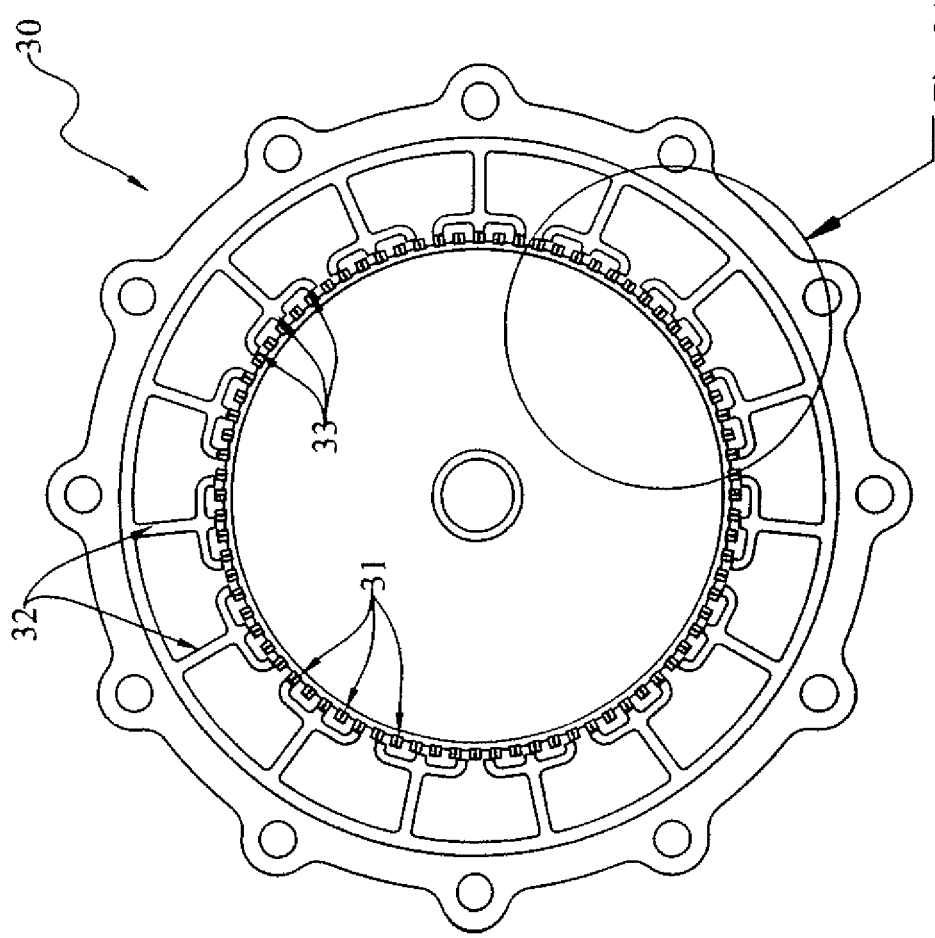
Fig. 3A
Fig. 3

PERMANENT MAGNET MOTOR HAVING TEETH WITH FINGERS

CROSS-REFERENCE TO RELATED APPLICATIONS

This application claims the benefit of PCT International Application No. PCT/US08/10246, filed Aug. 29, 2008. The entire content of such application is incorporated by reference herein.

TECHNICAL FIELD

The present invention relates generally to indexing and stepping motors, and, more particularly, to improved permanent magnet-type stepping motors that afford the capability of increased performance (e.g., torque) in a smaller package. The performance enhancement is derived from a two-fold advantage gained through the inventive design that (a) increases motor torque density features, and (b) improves step synchronization and stability.

BACKGROUND ART

There are generally three types of stepping motors: the variable reluctance-type, the hybrid-type, and the permanent-magnet type. With an appropriate driver (i.e., controller), all three types offer the capability of a wide range of angular stepping or indexing movements and characteristics. A general reference on control of stepping motors can be found on-line at http://www.cs.uiowa.edu/~jones/step/ by Douglas W. Jones. The present invention concerns permanent magnet-type stepping motors.

Both hybrid-type and permanent magnet-type stepping motors use permanent magnet(s) in the moving (e.g., rotor) and stationary (e.g., stator) structures. They can be indistinguishable from the motor driver's point of view. Traditionally, the rotor of a hybrid-type stepping motor is built with a donut-shaped magnet at the center of two rotor poles, resulting predominantly in axial flux flow from the magnet to the two rotor poles. Various stepping motor designs involving permanent magnets are derived from magnetic circuit manipulation of poles and magnets. The permanent magnet-type stepping motors with which this invention is principally concerned are representatively shown and described by Schaeffer in U.S. Pats. No. 4,190,779 and 4,315,171, the aggregate disclosures of which are hereby incorporated by reference.

The permanent magnet-type stepping motors disclosed by Schaeffer have a large number of stator teeth and a large number of radially-magnetized magnets on the rotor to provide for small stepping angles. These motors have the advantage of high unpowered and powered detent torques, relatively-short axial motor lengths (i.e., pancake style), small rotor inertias, and large through-hole solutions on the rotor. These motors have found great success in the last thirty years in space applications, such as in powering solar array drives and antenna pointing mechanisms. Such applications have required light masses, high powered and unpowered detent torques, small rotor inertias, large shafts and/or large numbers of harness feed-throughs on the rotor.

Advanced applications require state-of-the-art stepping motor designs with more torque, reduced size and mass, higher torque density, smaller rotor inertia, reduced cost, constant peak powered and unpowered detent torques, and constant peak running torques. Inherent in a stepping motor design is the concern of maintaining synchronization, that is, the ability of the motor and output load to maintain rotation together in response to every motor input command signal. Given that there is typically no feedback to assure that this synchronous operation of the stepping motor and load occurs, the stepping motor's output is dependent not only on the torque production capability, but also on the motor's stability of action in response to step commands while driving the load. Stepping motors operate open-loop, and so system concerns such as resonances may be mitigated through enhanced motor stability. Hence, the necessity exists to improve both torque density and step stability in order to improve upon state-of-the-art stepping motor technology.

DISCLOSURE OF THE INVENTION

With parenthetical reference to the corresponding parts, portions or surfaces of the disclosed embodiment, merely for purposes of illustration and not by way of limitation, the present invention broadly provides an improved permanent magnet-type stepping motor (e.g., 20) having a movable member and a stationary member. The improved motor broadly includes: a number of magnetic poles (e.g., 21) on a surface (e.g., 24) of one of the members. Adjacent rotor poles are of opposite polarity. The number of poles is a function of a constant, the number of phases, and a desired step interval. The invention also includes a number of equally-spaced teeth (e.g., 22) on the other of the members that are arranged to face toward the one member surface, each of the teeth having a plurality of fingers (e.g., 23) arranged to face toward the one member surface. The number of the teeth is a whole integer that is a function of a constant, the number of the poles, the number of the fingers on each stator tooth, and the number of phases. The fingers are spaced from one another such that the fingers on any given tooth will align with poles of the same polarity.

The movable member may be a rotor having an outer surface. The stationary member may be a stator. The desired step interval may be a desired step angle. The teeth may be spaced circularly about the stator to face toward the rotor outer surface.

The number of rotor poles for a unipolar motor driver must be an even integer determined from the equation:

$$\text{step angle} = \frac{2 \times 360°}{(\text{no. of phases}) \times (\text{no. of rotor poles})} \quad [1]$$

The number of rotor poles for a bipolar motor driver must be an even integer determined from the equation:

$$\text{step angle} = \frac{360°}{(\text{no. of phases}) \times (\text{no. of rotor poles})} \quad [2]$$

The rotor poles may be spaced equally about the rotor support (24) which may be formed of solid soft magnetic steel(s), electrical lamination material(s), or a combination of these materials.

The maximum number of stator teeth (m) per phase may be determined by the equation:

$$m \leq \text{int}\left(\frac{\text{no. of rotor poles}}{[2 \times (\text{no. of fingers per stator tooth}) - 1] \times (\text{no. of phases})}\right), \quad [3]$$

where the expression, int(x), is the integer function that returns the integer portion of its argument (x). The distance between two neighboring fingers on a given stator tooth may be such that when the fingers align with the rotor poles, they will align with the same polarity of rotor poles.

The teeth are preferably spaced equally about the stator.

The stator may be formed of solid soft magnetic steel(s), electrical steel lamination material(s), or a combination of these materials.

The rotor and stator may be configured and arranged such that for a two-phase motor having phases A and B, when the phase A fingers on the stator teeth align with the rotor poles, each phase B finger will align with the center of two neighboring rotor poles.

The rotor and stator may be configured and arranged such that for a three-phase motor having phases A, B and C, when the phase A stator fingers align with the rotor poles of one polarity, each phase B and phase C stator finger will align with rotor poles of the opposite polarity. If each phase B stator finger aligns with the leading edge of an associated rotor pole, each phase C finger may align with the trailing edge of an associated rotor pole. Conversely, if each phase B stator finger aligns with the trailing edge of an associated rotor pole, each phase C finger may align with the leading edge of an associated rotor pole.

The rotor and stator may be configured and arranged such that for a four-phase motor having phases A, B, C and D, when the phase A fingers on the stator teeth align with the rotor poles, each phase B finger will align with the center of two neighboring poles, each phase C finger will align with the opposite poles as those aligned with phase A, and each phase D finger will align with the opposite poles as those aligned with phase B Accordingly, the general object of the invention is to provide improved stepping motors.

Another object is to provide improved stepping motors of the permanent magnet type.

These and other objects and advantages will become apparent from the foregoing and ongoing written specification, the drawings and the appended claims.

BRIEF DESCRIPTION OF THE DRAWINGS

FIG. 2 is a schematic view showing the physical wiring diagram on the stator teeth of the stepping motor shown in FIG. 1.

FIG. 2A is an enlarged view of the portion within the indicated circle in FIG. 2.

FIG. 3 is a schematic cross-sectional view of a second form of an improved three-leadwire, wye-connected, three-phase, 1.5° per step, bipolar stepping motor having the same eighty alternately-magnetized rotor poles as in FIG. 1, but with fifteen equally-spaced stator teeth, with three fingers on each stator tooth.

FIG. 3A is an enlarged view of the portion within the indicated circle of FIG. 3.

FIG. 5B is a schematic electrical wiring diagram for the form shown in FIG. 5.

DESCRIPTION OF THE PREFERRED EMBODIMENTS

Figures 1, 2B:
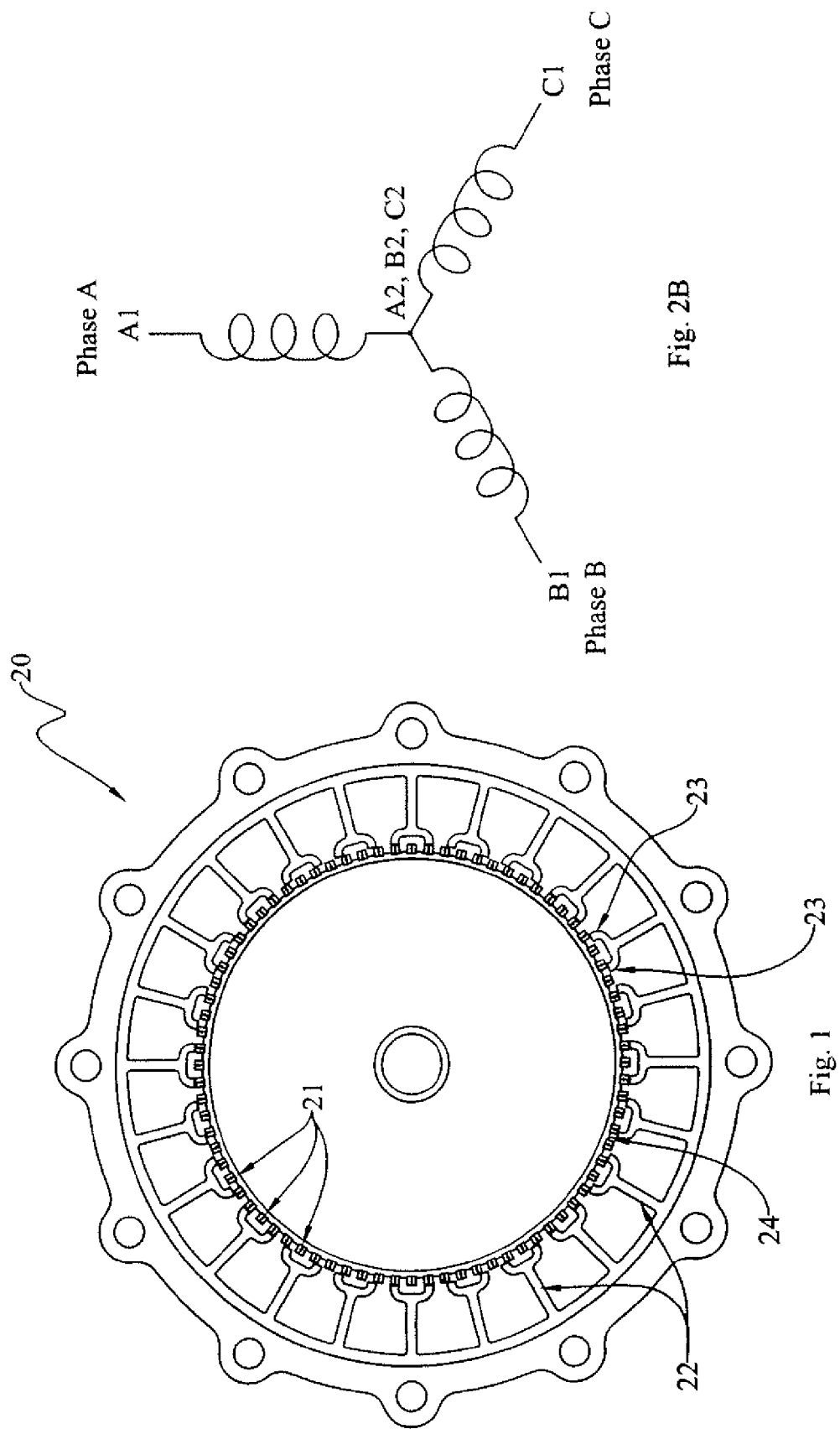
FIG. 1 is a schematic cross-sectional view of a first form of an improved three-leadwire, wye-connected, three-phase, 1.5° per step, bipolar stepping motor having eighty alternately-magnetized rotor poles and twenty-four equally-spaced stator teeth, with two fingers on each stator tooth.
FIG. 2B is a schematic electrical wiring diagram for the form shown in FIG. 2.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

In order to achieve high running torque, while maintaining high powered and unpowered detent torques, a new permanent magnet-type stepping motor was developed as disclosed herein.

A number of different forms of the improved stepping motor are disclosed. A first form is disclosed in FIGS. 1, 2, 2A, 2B and 2C; a second in FIGS. 3 and 3A; a third in FIGS. 4 and 4A; a fourth in FIGS. 5, 5A and 5B; a fifth in FIGS. 6, 6A and 6B; a sixth in references to the first and fourth; a seventh in FIG. 7; and an eighth in FIGS. 8 and 9.

These various forms show how a 1.5° per step indexing motion can be achieved for two-, three- and four-phase bipolar or unipolar motor drivers. These forms also show how the same rotor with one hundred and twenty alternately-magnetized poles can be used for two-, three- and four-phase motors. The individual forms will illustrate that a stator tooth can be designed to have two, three, four or more fingers. The forms will also show motor excitation sequences and windings with four-, five-, six- and eight-leadwire configurations that are commonly used in variable reluctance-type, hybrid-type, and permanent magnet-type stepping motors.

Although only eighty- and one hundred twenty-pole rotors are illustrated herein for two-, three- and four-phase stepping motors, other forms, such as those listed in Table 1, are easily understood by those who are skilled in the art of stepping motor design.

The required number of magnet poles on the outer peripheral surface of the rotor is determined by the desired step angle, the number of phases, and the motor driver configuration. The numbers of North and South magnet poles must be equal. The adjacent North and South magnet poles are schematically shown in the accompanying drawing figures, with radial arrows of adjacent poles pointing inwardly and outwardly, respectively, to indicate opposite polarities. Therefore, because the numbers of North and South magnet poles are equal, the total number of rotor poles must be an even integer.

For a bipolar motor driver, the number of rotor poles must be an even integer determined from the equation:

$$\text{step angle} = \frac{360°}{(\text{no. of phases}) \times (\text{no. of rotor poles})} \quad [4]$$

For example, for a three-phase, 1.5° per step, stepping motor that is driven by a bipolar driver, the required number of rotor poles is: 360°/(3×1.5°)=80. This example is shown in FIGS. 1 and 3 designs.

For a two-phase, 1.5° per step, stepping motor that is driven by a bipolar driver, the required number of rotor poles is: 360°/(2×1.5°)=120. This example is shown in the FIGS. 4 and 7 designs.

For a unipolar motor driver, the number of rotor poles must be an even integer determined from the equation:

$$\text{step angle} = \frac{2 \times 360°}{(\text{no. of phases}) \times (\text{no. of rotor poles})} \quad [5]$$

Figure 7:
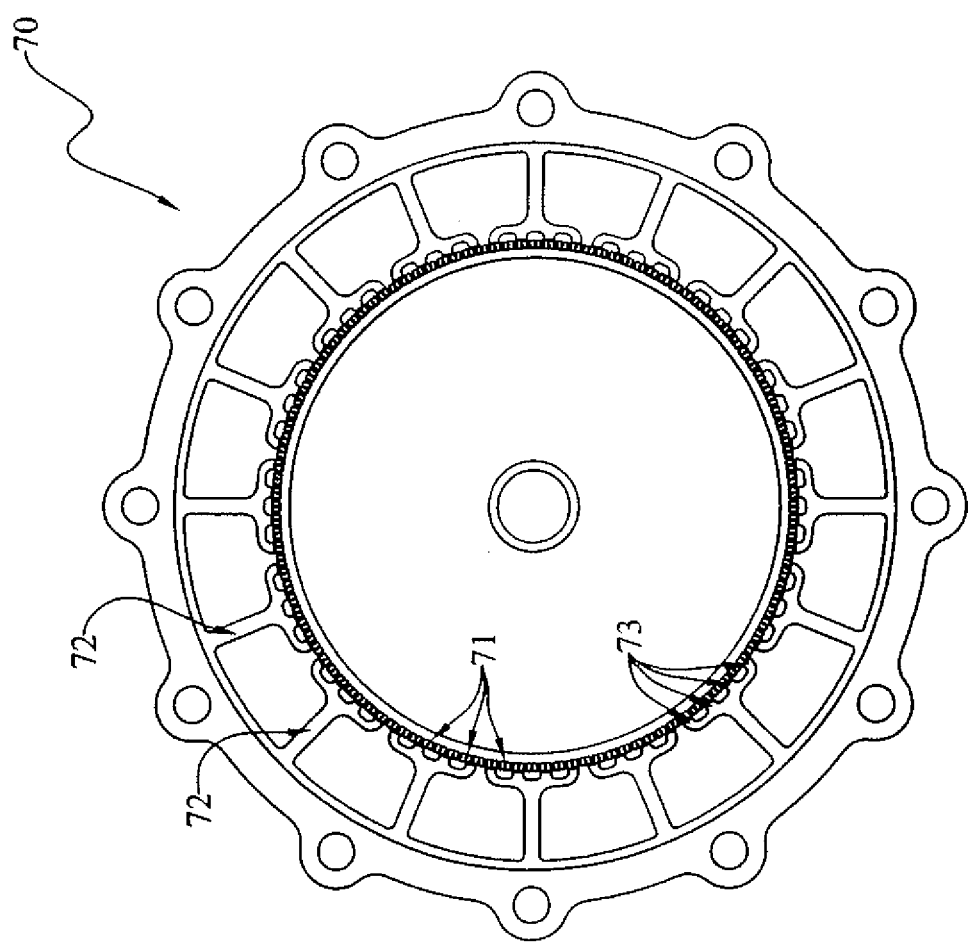
FIG. 7 is a schematic cross-sectional view of another form of two- or four-phase stepping motor, generally similar to FIG. 4, with one hundred and twenty alternately-magnetized rotor poles and sixteen equally-spaced stator teeth, but with four fingers on each stator tooth.

For example, for a four-phase, 1.5° per step, stepping motor that is driven by a unipolar driver, the required number of rotor poles is: 2×360°/(4×1.5°)=120. This example is shown in FIGS. 4 and 7 designs, which are the same designs without windings as those for the above two-phase example.

The above three examples have demonstrated the required number of rotor poles for 1.5° per step motors driven by two- and three-phase bipolar motor driver and four-phase unipolar motor driver.

All magnet poles can be spaced equally about the rotor with adjacent poles pointing in opposite- or alternately-magnetized directions, and can be made with premagnetized members that are bonded to the surface of the supporting rotor, which can be made of soft magnetic steel(s), electrical steel lamination(s), or various combinations of these materials. Alternatively, the magnetic poles can be made with unmagnetized magnetic materials applied to the rotor outer surface, and locally magnetized to have alternate polarities. However, only a limited number of poles can be magnetized on the rotor outer surfaces with this approach, and a large number of poles would make this approach either impossible or impractical.

Adequate spacing between adjacent magnet poles, which is obtained with magnet slots on rotor support, may be allocated so that equally-spaced poles can be easily achieved. No spacing between adjacent magnet poles, such as those shown in prior U.S. Pat. Nos. 6,329,729 and 6,657,353, will make equally spaced poles difficult to achieve because pole spacing is dependant upon the widths of the magnets. Even if a rotor was made without pole spacing, as those shown in the above referred patents, it will be difficult to obtain constant peak powered and unpowered detent torques and constant peak running torque due to magnet variations.

A small number of magnet poles on a large-diameter rotor will leave empty spaces between adjacent magnet poles, thus making the stepping motor less compact. On the other hand, a large number of magnet poles on a small diameter rotor will require thin magnets, making it impractical to fabricate.

Table 1 lists some selected rotor pole, step angle and phase relationships for bipolar and unipolar motor drivers calculated according to Equations [1] and [2], supra. Fractional step angles are inevitable in the calculations, but can be avoided for practical reasons, such as machining or technical accuracy of fractional angles.

TABLE 1

| No. of Rotor Poles | Step Angle for Bipolar Driver Number of Phases | | | | Step Angle for Unipolar Driver Number of Phases | | | |
|---|---|---|---|---|---|---|---|---|
| | 2 | 3 | 4 | 5 | 2 | 3 | 4 | 5 |
| 12 | 15 | 19 | 7.5 | 6 | 30 | 20 | 15 | 12 |
| 16 | 11.25 | 7.5 | 5.625 | 4.5 | 22.5 | 15 | 11.25 | 9 |
| 18 | 10 | 6.6667 | 5 | 4 | 20 | 13.3333 | 10 | 8 |
| 20 | 9 | 6 | 4.5 | 3.6 | 18 | 12 | 9 | 7.2 |
| 24 | 7.5 | 5 | 3.75 | 3 | 15 | 10 | 7.5 | 6 |
| 30 | 6 | 4 | 3 | 2.4 | 12 | 8 | 6 | 4.8 |
| 32 | 5.625 | 3.75 | 2.8125 | 2.25 | 11.25 | 7.5 | 5.625 | 4.5 |
| 36 | 5 | 3.3333 | 2.5 | 2 | 10 | 6.6667 | 5 | 4 |

TABLE 1-continued

| No. of Rotor Poles | Step Angle for Bipolar Driver Number of Phases | | | | Step Angle for Unipolar Driver Number of Phases | | | |
|---|---|---|---|---|---|---|---|---|
| | 2 | 3 | 4 | 5 | 2 | 3 | 4 | 5 |
| 40 | 4.5 | 3 | 2.25 | 1.8 | 9 | 6 | 4.5 | 3.6 |
| 48 | 3.75 | 2.5 | 1.875 | 1.5 | 7.5 | 5 | 3.75 | 3 |
| 50 | 3.6 | 2.4 | 1.8 | 1.44 | 7.2 | 4.8 | 3.6 | 2.88 |
| 60 | 3 | 2 | 1.5 | 1.2 | 6 | 4 | 3 | 2.4 |
| 72 | 2.5 | 1.6667 | 1.25 | 1 | 5 | 3.3333 | 2.5 | 2 |
| 80 | 2.25 | 1.5 | 1.125 | 0.9 | 4.5 | 3 | 2.25 | 1.8 |
| 90 | 2 | 1.3333 | 1 | 0.8 | 4 | 2.6667 | 2 | 1.6 |
| 96 | 1.875 | 1.25 | 0.9375 | 0.75 | 3.75 | 2.5 | 1.875 | 1.5 |
| 100 | 1.8 | 1.2 | 0.9 | 0.72 | 3.6 | 2.4 | 1.8 | 1.44 |
| 120 | 1.5 | 1 | 0.75 | 0.6 | 3 | 2 | 1.5 | 1.2 |

For the same number of rotor poles and phases, a stepping motor with a bipolar motor driver steps at half the angle of a stepping motor with a unipolar driver. Conversely, in order to achieve the same step angle, a stepping motor with a unipolar driver requires twice the number of rotor poles as those require for a stepping motor with a bipolar driver.

The maximum number of stator teeth per phase, m, for both bipolar and unipolar motor drives must satisfy the equation:

$$\text{int}\left(\frac{360°}{(\text{no. of rotor poles})\times[2\times(\text{no. of fingers per stator tooth})-1]\times(\text{no. of phases})}\right)\times m \leq 360° \quad [6]$$

where the expression, int(x), is the integer function that returns the integer portion of its argument (x). This equation can be simplified to:

$$m \leq \text{int}\left(\frac{\text{no. of rotor poles}}{[2\times(\text{no. of fingers per stator tooth})-1]\times(\text{no. of phases})}\right) \quad [7]$$

The distance between two neighboring fingers on a given stator tooth must be such that when the fingers align with the rotor poles, they must align with rotor poles of the same polarity. Therefore, the expression,

[2×(no. of fingers per stator tooth)−1], in the above Equations [6] and [7] is the total number of rotor poles covered by each stator tooth.

For the three-phase, 1.5° per step, eighty-pole, bipolar stepping motor with two fingers per stator tooth, the maximum number of stator teeth per phase (Equation 7, supra) is:

$$m \leq \text{int}\left(\frac{80}{(2\times 2-1)\times 3}\right) = \text{int }(8.9) \rightarrow 8 \text{ stator teeth/phase.} \quad [8]$$

Therefore, the maximum number of stator teeth is:

max. no. of stator teeth=(3 phases)×(8 teeth/phase)
=24 teeth. [9]

This example is shown in FIG. 1 design.

For the same three-phase, 1.5° per step, eighty-pole, bipolar stepping motor but with three fingers per stator tooth, the maximum number of stator teeth per phase is:

$$m \leq \text{int}\left(\frac{80}{(2\times 3-1)\times 3}\right) = \text{int }(5.3) \rightarrow 5 \text{ stator teeth/phase.} \quad [10]$$

Therefore, the maximum number of stator teeth is:

max. no. of stator teeth=(3 phases)×(5 teeth/phase)
=15 teeth. [11]

This example is shown in FIG. 3 design.

For the four-phase, 1.5° per step, one hundred twenty-pole, unipolar stepping motor design with four fingers per stator tooth, the maximum number of stator teeth per phase is:

$$m \leq \text{int}\left(\frac{120}{(2\times 4-1)\times 4}\right) = \text{int }(4.3) \rightarrow 4 \text{ stator teeth/phase.} \quad [12]$$

Therefore, the maximum number of stator teeth is:

max. no. of stator teeth=(4 phases)×(4 teeth/phase)
=16 teeth. [13]

This example is shown in the FIG. 7 design.

It is optional to use the maximum number of stator teeth and the number of fingers so long as Equation [7] is satisfied. FIGS. 1 and 3 both show three-phase stepping motors with the same eighty alternately-magnetized rotor poles. The FIG. 1 design uses a stator with twenty-four equally-spaced teeth and two fingers on each tooth. However, the FIG. 3 design uses a stator having fifteen equally-spaced teeth with three fingers on each stator tooth. It is obvious that FIG. 3 design may also use two fingers on each of the fifteen equally-spaced stator teeth. Similarly, FIGS. 4 and 7 both show two- or four-phase stepping motors with the same one hundred and twenty alternately-magnetized rotor poles and sixteen equally-spaced stator teeth. The design shown in FIG. 7 has four fingers on each stator tooth, while the design in FIG. 4 has three fingers on each stator tooth.

The selection of the numbers of stator teeth and the number of fingers on each tooth will affect the motor detent torque, the motor running torque, and the winding resistance if the windings are first wound on a mandrel and then transferred onto the stator teeth. For the same two- or four-phase, 1.5° per step, stepping motors, the design shown in FIG. 7 with four fingers will have more unpowered detent torque than the design shown in FIG. 4 with three fingers. However, if the windings are wound on a mandrel and then transferred onto the stator teeth, the required winding end turn length for the design shown in FIG. 7 will be more than that for the design shown in FIG. 4. This results in more phase resistance for the FIG. 7 windings than that for the FIG. 4 windings.

These various forms will be discussed seriatim herebelow.

First Form (FIGS. 1, 2, 2A, 2B and 2C)

The three-leadwire, wye-connection, three-phase, 1.5° per step, bipolar stepping motor design, generally indicated at 20 in FIG. 1, generates several times more torque than the Schaeffer-type stepping motors (see, e.g., U.S. Pat. Nos. 4,190,779 and 4,315,171, supra) of identical phase resistance, mechanical dimensions and unpowered detent torque that have been produced at Schaeffer Magnetics/Moog Inc. for the last thirty years.

FIG. 1 shows a cross-sectional view of a three-phase stepping motor 20 with eighty alternately-magnetized rotor poles, severally indicated at 21, and with twenty-four equally-spaced stator teeth, severally indicated at 22. Each stator tooth has two fingers, severally indicated at 23. The generic mounting flange along with generic mounting holes on the stator and the shaft on the rotor are common to all motors illustrated herein. The stator and mounting flange, which are also common to all other motors disclosed herein, can be made with solid soft magnetic steels in one piece for low stepping rate applications. It can also be laminated with electrical steel lamination materials and/or mounted inside a structural housing for high stepping rate applications.

FIG. 2 shows the physical wiring diagram on the stator teeth of a wye-connection, three-leadwire, three-phase, 1.5° per step, bipolar stepping motor with eighty rotor poles and twenty-four stator teeth, as shown in FIG. 1. Since there are twenty-four stator teeth and three phases, each phase has eight serially-connected coils. There are six excitation states. Continuous stepping requires repetitions of these six excitation sates. At each excitation state, the two terminals that have the same polarity are connected together, resulting in a parallel current path in the two windings from the tied center (i.e., A2, B2 and C2) to the two terminals. The excitation sequence is shown in Table 2:

TABLE 2

| State | Terminal | | |
|---|---|---|---|
| | A1 | B1 | C1 |
| 1 | + | + | − |
| 2 | + | − | − |
| 3 | + | − | + |
| 4 | − | − | + |
| 5 | − | + | + |
| 6 | − | + | − |

This excitation sequence in the order from States 1 through 6 will result in rotor rotation in the clockwise ("CW") direction in FIG. 2. Reversal of the above excitation sequence will result in rotor rotation in the counterclockwise ("CCW") direction in FIG. 2. Similarly, reversal of winding direction on each stator tooth to the opposite direction, as shown in FIGS. 2 and 2A, will result in the reversal of the direction of rotor rotation.

FIG. 2A shows a close-up view of the physical relationship among the rotor poles, stator teeth, and physical windings shown in FIGS. 1 and 2. When the phase A stator fingers align with the rotor poles of one polarity, each of the phase B or phase C stator fingers will align with either the leading edges (or trailing edges) or the trailing edges (or leading edges) of rotor poles of the opposite polarity to those aligned with phase A. Thus, three distinctly-positioned stator teeth, one for each phase, are created in relation to the rotor poles. The twenty-four equally-spaced stator teeth are, therefore, eight repetitions of the three distinctly-positioned stator teeth. Such stator finger and rotor pole alignments are required for all three-phase stepping motors disclosed herein for rotational, linear, sectional or fractional, reversed and axial air gap forms.

Figure 2C:
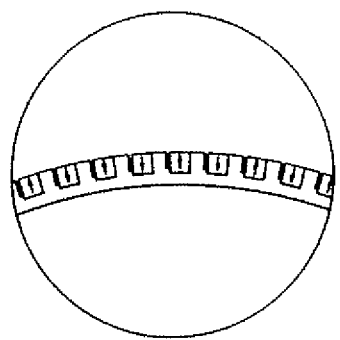
FIG. 2C shows an alternative rotor for that shown in FIG. 2A for a technique in reducing the magnetic strength variations among magnets in order to build a rotor with more-constant unpowered peak detent, powered peak detent, and peak running torque.

Variations among magnet strength will cause peak powered and unpowered detent torque variations and motor peak running torque variations. FIG. 2C shows a technique in reducing the magnetic strength variations among magnets in order to build a rotor with more constant peak powered and unpowered detent and peak running torques. In comparison with the close-up views of the rotors shown in FIGS. 2A, 3A, 4A, 5A and 6A, the magnet slots on the soft magnetic steel or laminated electrical lamination rotor support in FIG. 2C are deeper and wider.

FIG. 2B is an electrical wiring diagram of FIG. 2 of the wye-connected coils with a common tied center.

Second Form (FIGS. 3 and 3A)

FIG. 3 shows the cross-section view of another three-phase stepping motor, generally indicated at 30, of a design similar to that shown FIGS. 1, 2 and 2A, with the same eighty alternately-magnetized rotor poles (severally indicated at 31), but with fifteen equally-spaced stator teeth (severally indicated at 32), and three fingers (severally indicated at 33) on each stator tooth. As shown in FIG. 3A, there are three distinctly-positioned stator teeth, one for each phase, in relation to the rotor poles. The fifteen equally-spaced stator teeth in FIG. 3 are, therefore, five repetitions of those three distinctly-positioned stator teeth. The physical and electrical wiring diagrams are thus based on the same principle as discussed for FIGS. 2, 2A and 2B, and are omitted.

Figure 4A:
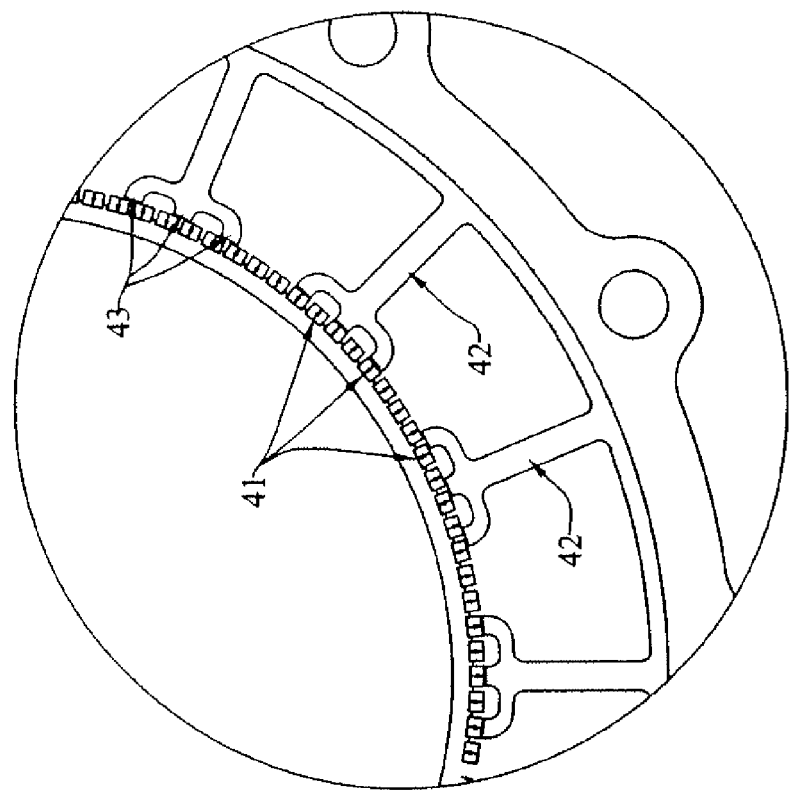
FIG. 4A is an enlarged view of the portion within the indicated circle of FIG. 4.
Figure 4:
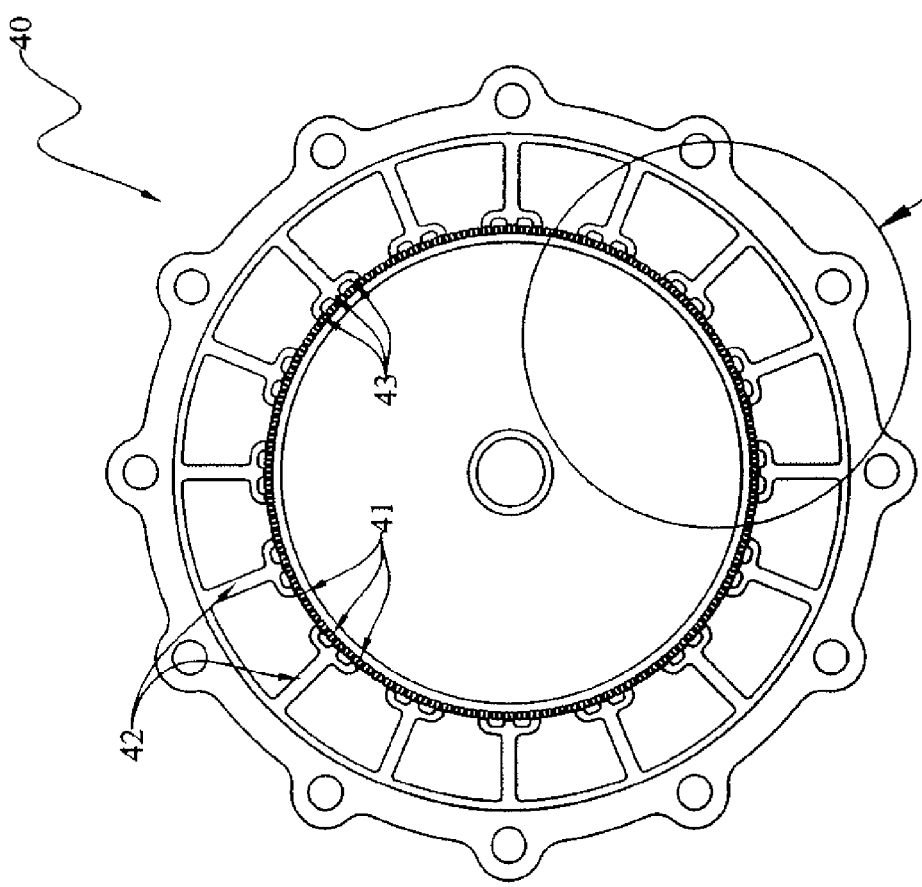
FIG. 4 is a schematic cross-sectional view of a two- or four-phase stepping motor with one hundred and twenty alternately-magnetized rotor poles and sixteen equally-spaced stator teeth, and with three fingers on each stator tooth.

Third Form (FIGS. 4 and 4A)

FIG. 4 shows the cross-section view of a two- or four-phase stepping motor, generally indicated at 40, with one hundred and twenty alternately-magnetized rotor poles (severally indicated at 41), and sixteen equally-spaced stator teeth (severally indicated at 42). Each stator tooth has three fingers (severally indicated at 43). FIG. 4A shows a close-up view of the physical alignment relationship among the rotor poles and stator teeth. The detailed alignment relationship will be explained below with physical wiring diagrams.

Figure 5:
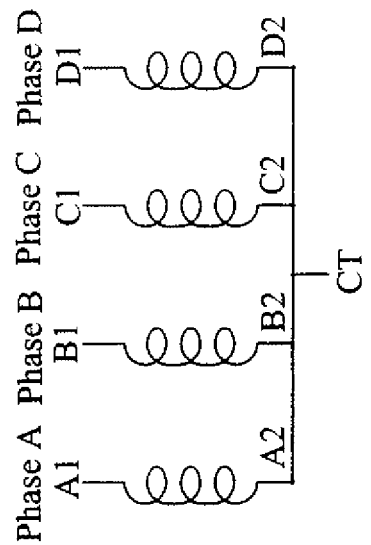
FIG. 5 is a schematic view showing the physical wiring diagram on the stepping motor in FIG. 4 of a five-leadwire, four-phase, 1.5° per step, unipolar stepping motor.
Figure 5:
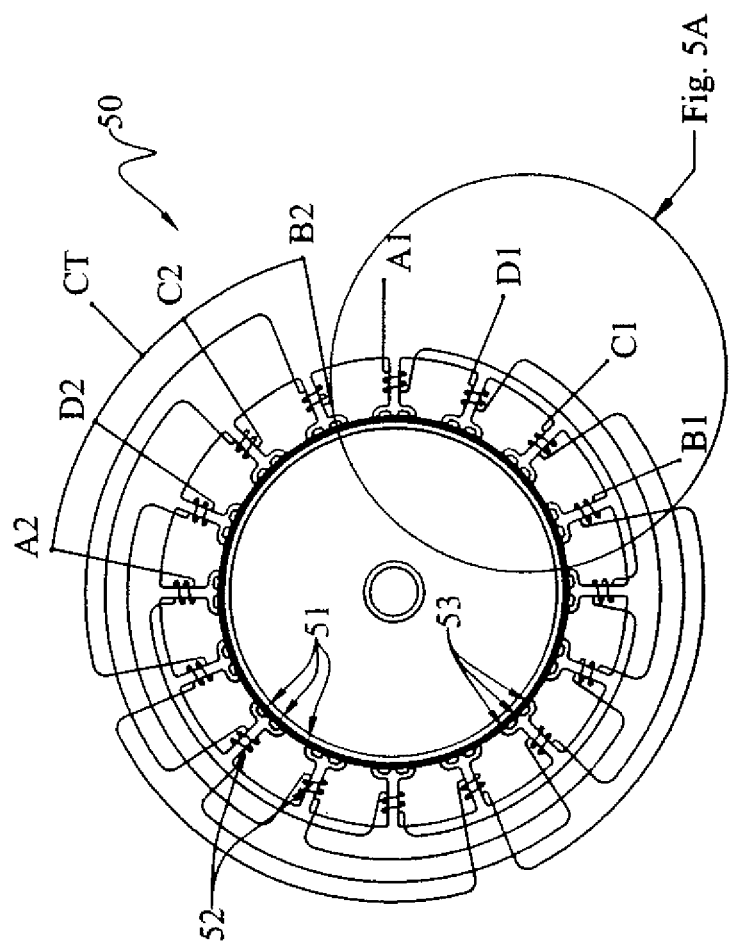
Figure 5A:
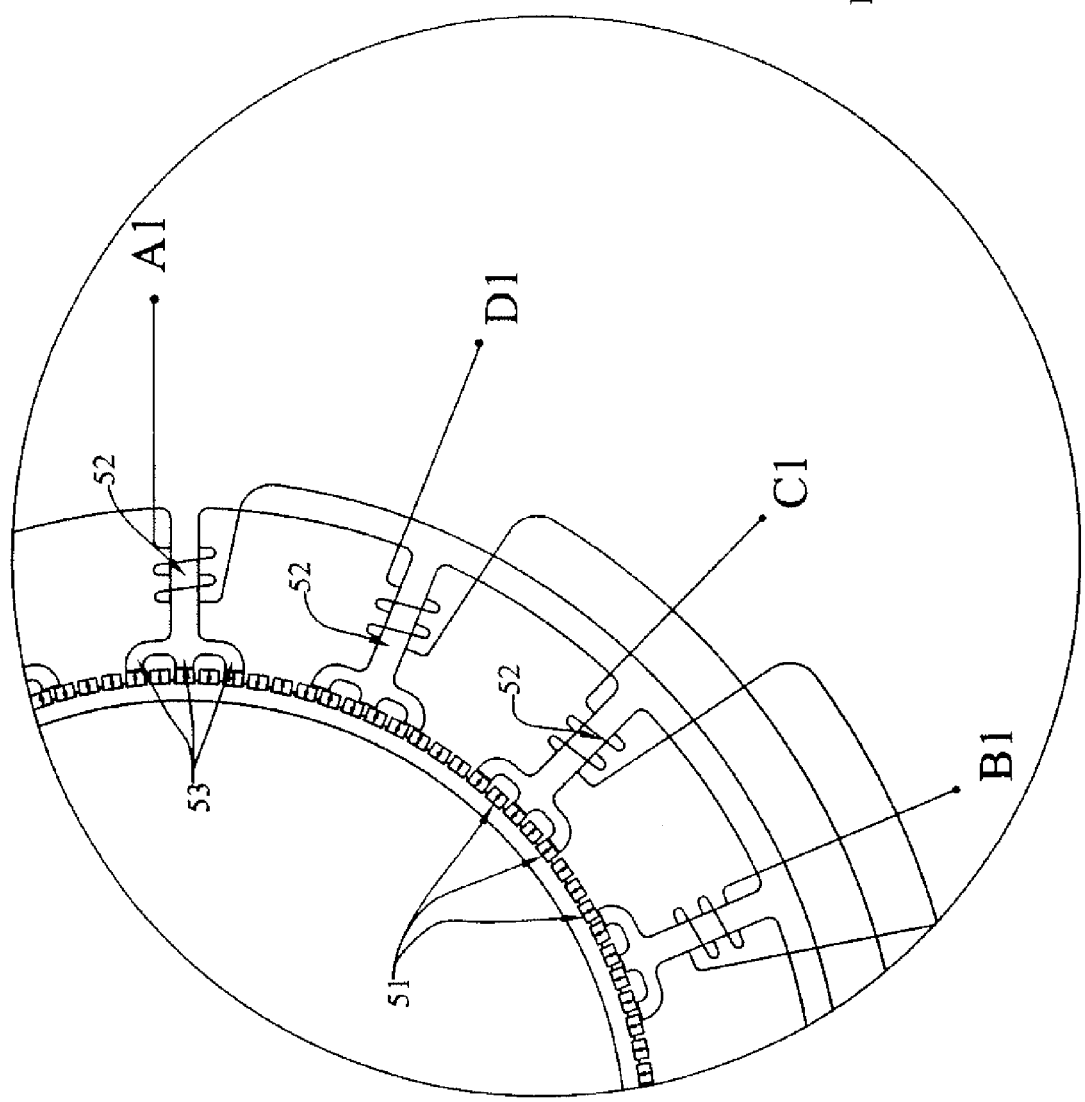
FIG. 5A is an enlarged view of the portion within the indicated circle of FIG. 5

Fourth Form (FIGS. 5, 5A and 5B)

FIG. 5 shows the physical wiring diagram on the stator teeth of FIG. 4 of a five-leadwire, four-phase, 1.5° per step, unipolar stepping motor, generally indicated at 50, with one hundred and twenty rotor poles (severally indicated at 51), and sixteen stator teeth (severally indicated at 52), and three fingers (severally indicated at 53) per stator tooth. Each phase has four serially-connected coils. There are four excitation states, one for each phase. The center tap (CT) voltage can be either positive or negative, where the excitation table shows only the positive voltage polarity on the center tap.

The excitation sequence is shown in Table 3:

TABLE 3

| State | Terminal | | | | |
|---|---|---|---|---|---|
| | A1 | B1 | C1 | D1 | CT |
| 1 | − | | | | + |
| 2 | | − | | | + |
| 3 | | | − | | + |
| 4 | | | | − | + |

This excitation sequence in the order fro States 1 through 4 will result in rotor rotation in the clockwise ("CW") direction in FIG. 5. Reversal of the above excitation sequence will result in rotor rotation in the counter-clockwise ("CCW") direction in FIG. 5. Similarly, reversal of winding direction on each stator tooth to the opposite direction, as shown in FIGS. 5 and 5A, will result in the reversal of direction of rotor rotation.

FIG. 5A shows a close-up view of the relationship among rotor poles, stator teeth, and physical windings in FIG. 5 for a four-phase, 1.5° per step, unipolar stepping motor, generally indicated at 50. This arrangement has one hundred and twenty rotor poles (severally indicated at 51), sixteen stator teeth (severally indicated at 52), and three fingers (severally indicated at 53) per tooth. When the phase A fingers on the stator teeth align with the rotor poles, each phase B finger will align at the center of two neighboring poles, each phase C finger will align with the opposite poles as those aligned with phase A, and each phase D finger will align with the opposite poles as those aligned with phase B. Thus, four distinctly-positioned stator teeth, one for each phase, are created in relation to the rotor poles. The sixteen equally-spaced stator teeth in FIG. 5 are, therefore, four repetitions of those four distinctly-positioned stator teeth. Such stator finger and rotor pole alignments in FIG. 5A are required for all four-phase stepping motors disclosed herein for rotational, linear, sectional or fractional, reversed, and axial air gap forms.

FIG. 5B is an electrical wiring diagram of FIG. 5 with a common center tap. Another commonly used four-phase unipolar motor driver requires six-leadwires with two center taps. This can be accomplished, for example in FIGS. 5 and 5B, by connecting A2 and B2 to one center tap, and connecting C2 and D2 to the other center tap. The two center taps serve the same function as the one center tap shown in FIG. 5B. The four-state excitation polarity sequences remain the same as Table 3 but with an extra center tap.

Figures 6, 6A, 6B:
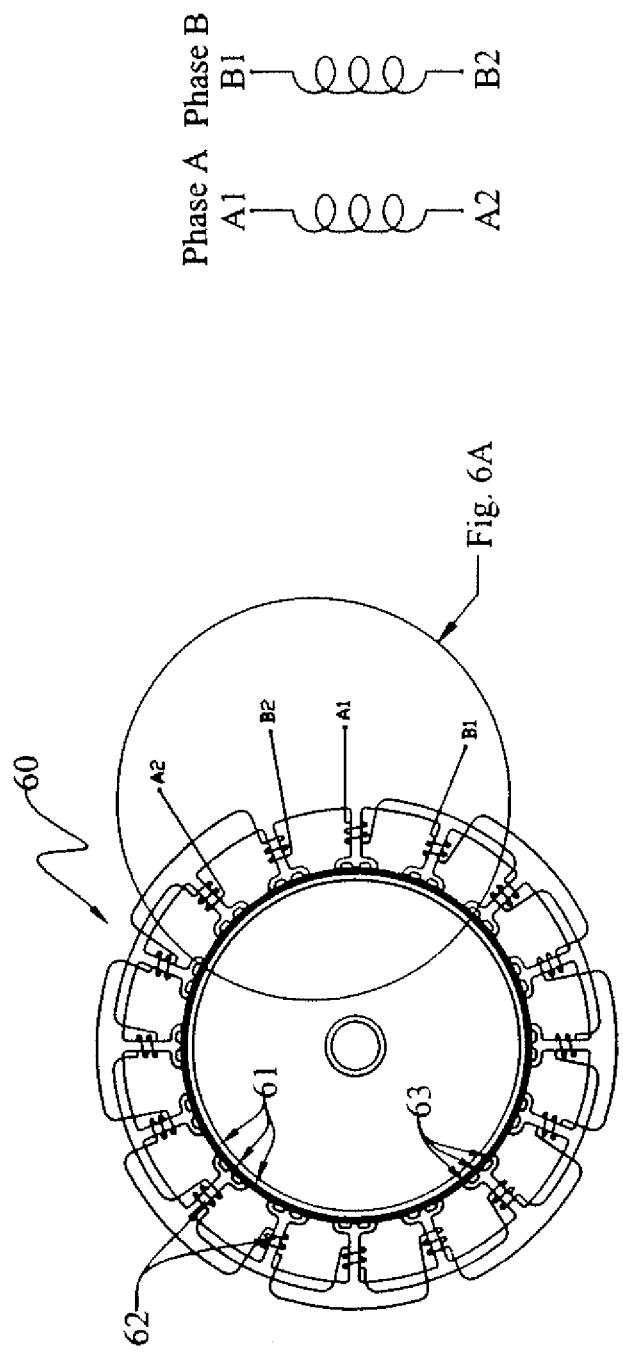
FIG. 6 is a schematic view showing the physical wiring diagram of the same stepping motor in FIG. 4 of a four-leadwire, two-phase, 1.5° per step, bipolar stepping motor.
FIG. 6A is an enlarged view of the portion within the indicated circle in FIG. 6.
FIG. 6B is a schematic electrical wiring diagram for the form shown in FIG. 6.
Figure 6A:
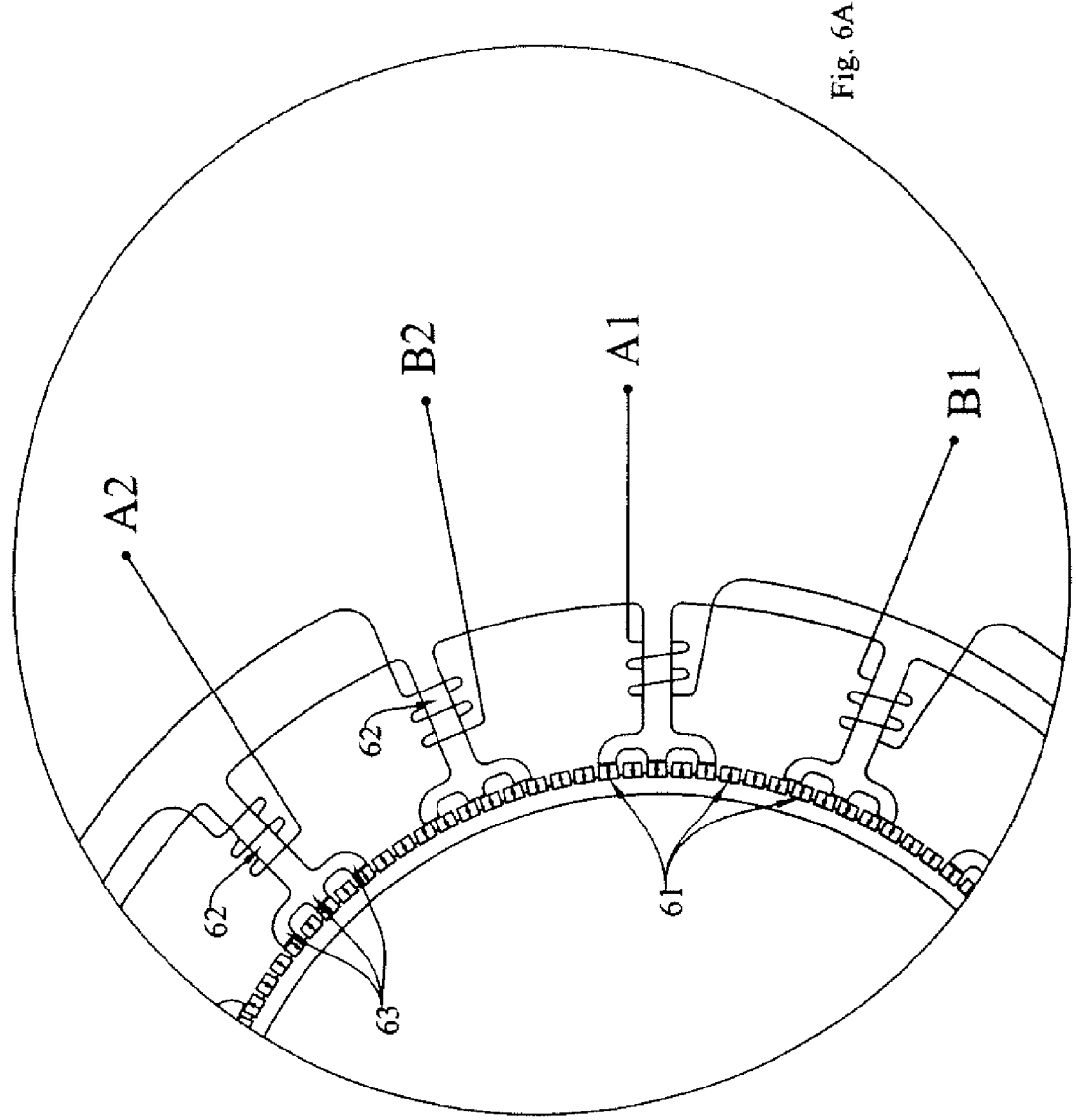

Fifth Form (FIGS. 6, 6A and 6B)

FIG. 6 shows the physical wiring diagram on the stator teeth of FIGS. 4 and 4A of a four-leadwire, two-phase, 1.5° per step, bipolar configuration, generally indicated at 60, with one hundred and twenty rotor poles (severally indicated at 61), sixteen stator teeth (severally indicated at 62), and three fingers (severally indicated at 63) per tooth. The excitation sequences are shown in Table 4:

TABLE 4

| State | Terminal | | | |
|---|---|---|---|---|
| | A1 | B1 | A2 | B2 |
| 1 | + | | − | |
| 2 | | + | | − |
| 3 | − | | + | |
| 4 | | − | | + |

This excitation sequence in the order from States 1 through 4 will result in rotor rotation in the clockwise ("CW") direction in FIG. 6. Reversal of the above excitation sequence will result in rotor rotation in the counterclockwise ("CCW") direction in FIG. 6. Similarly, reversal of winding direction on each stator tooth to the opposite direction, as shown in FIGS. 6 and 6A, will result in the reversal of the direction of rotor rotation.

FIG. 6A shows a close-up view of the relationship among rotor poles, stator teeth, and windings in FIG. 6 for a two-phase, 1.5° per step, bipolar stepping motor, generally indicated at 60. This arrangement has one hundred and twenty rotor poles (severally indicated at 61), sixteen stator teeth (severally indicated at 62), and three fingers (severally indicated at 63) per tooth. When the phase A fingers on the stator teeth align with the rotor poles, each phase B finger will align at the center of two neighboring rotor poles. The next phase A fingers will align with the opposite poles as those aligned with the previous phase A, and the next phase B fingers will align with the opposite poles as those aligned with the previous phase B. When wired as shown in FIG. 6 in the patterns of +A, −A, +A, −A and so on for phase A, and +B, −B, +B, −B, and so on for phase B, two distinctly-positioned stator teeth, one for each phase, are created in relation to the rotor poles. The sixteen equally-spaced stator teeth in FIG. 6 are, therefore, eight repetitions of those two distinctly-positioned stator teeth in FIG. 6A. Such stator and rotor pole alignments are required for all two-phase stepping motors disclosed herein for rotational, linear, sectional or fractional, reversed and axial air gap forms.

In the above illustrations of three types of physical wiring diagrams, FIGS. 2 and 2A for three-phase, FIGS. 5 and 5A for four-phase, and FIGS. 6 and 6A for two-phase, the wiring direction on each tooth for each phase is determined by the polarities of rotor poles that are aligned with the stator tooth fingers for each phase. For example, the stator fingers on all eight stator teeth in FIG. 2 for phase A align with the same rotor pole polarity, therefore, the wiring directions for all eight stator teeth are the same. Same are true for phases B or C. The same wiring directions are also true for FIG. 5. However, the phase A wiring diagram shown in FIG. 6 requires reversal of direction for every other tooth because rotor pole polarity changes for every other stator tooth for phase A. The same is true for phase B.

Sixth Form

An eight-leadwire configuration, two for each phase, can be made without center tap (as opposed to the center taps shown in FIGS. 5, 5A and 5B), resulting in more flexibility for driving either as unipolar or bipolar motor four-phase motor. Similarly for three-phase motor, a six-leadwire configuration, two for each phase, can be made without a tied center (as opposed to the tied center of A2, B2 and C2 shown in FIGS. 2 and 2B), resulting in more motor driving flexibility for driving either as unipolar or bipolar three-phase motor.

According to Table 1 for the above four-phase motor, the eight-leadwire bipolar driving scheme will create a step angle of 0.75 degree/step—half the step angle as compared to that created by a unipolar driver. Similarly for the above three-phase motor, the six-leadwire unipolar driving scheme will double the step angle of bipolar driving scheme.

Seventh Form (FIG. 7)

FIG. 7 is a cross-section view of another form of two- or four-phase stepping motor, generally similar to FIG. 4, with the same one hundred at twenty alternately-magnetized rotor poles and sixteen equally-spaced stator teeth, but with four fingers on each stator tooth. The physical and electrical wiring diagrams as well as the excitation polarity sequences are identical to those shown in FIGS. 5, 5A, 5B for four-phase and, 6, 6A, and 6B for two-phase motors.

Figure 9:
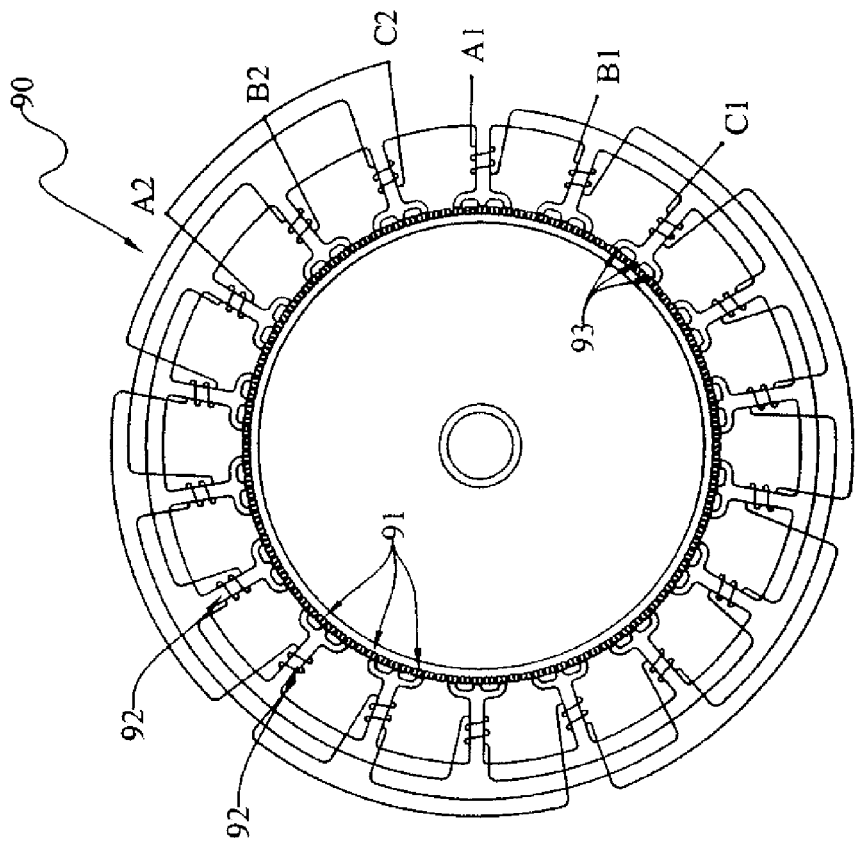
FIG. 9 is a schematic physical wiring diagram on the stator teeth as in FIG. 8 of a three-leadwire, three-phase, 1.0° per step, bipolar stepping motor.
Figure 8:
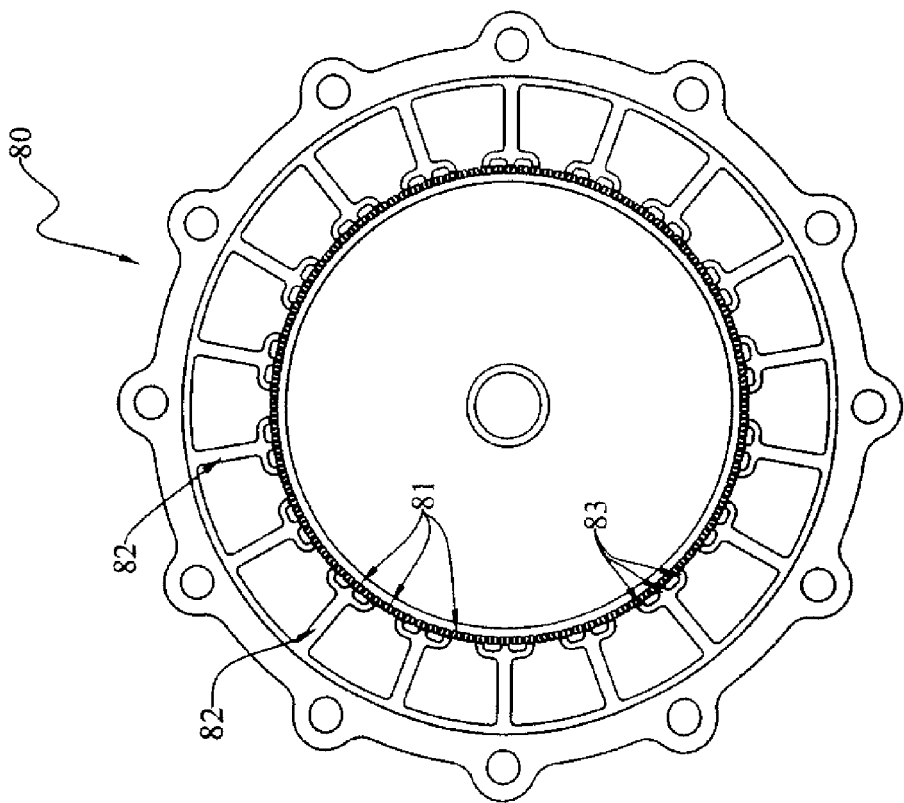
FIG. 8 is a schematic cross-sectional view of a three-phase stepping motor having a rotor that is the same as in FIGS. 4 and 7 with one hundred and twenty alternately-magnetized rotor poles, but with eighteen equally-spaced stator teeth, and with three fingers on each stator tooth.

Eighth Form (FIGS. 8, 9)

FIG. 8 shows the cross-section view of a three-phase, 1.0° per step, bipolar stepping motor, generally indicated at 80, with the same rotor as in FIGS. 4 and 7 with one hundred and twenty alternately-magnetized rotor poles (severally indicated at 81), but with eighteen equally-spaced stator teeth (severally indicated at 82). Each stator tooth has three fingers (severally indicated at 83).

FIG. 9 shows the physical wiring diagram of a Y-connection, three-leadwire, three-phase, 1.0° per step, bipolar stepping motor with one hundred and twenty rotor poles and eighteen stator teeth as shown in FIG. 8. Each phase has six serially-connected coils. The electrical wiring diagram is the same as those shown in FIG. 2B and the excitation polarity sequences are the same as shown in Table 2.

All of the above examples show that the stator teeth are equally spaced, and the numbers of stator teeth are in integer multiples of the number of phases (e.g., Equation 6). However, stepping motors can be designed (but are not recommended) with stator teeth that are not equally spaced, or in numbers of stator teeth that are not integer-multiples of the number of phases. For example, a four-phase, 3.0° per step, sixty-rotor pole, unipolar stepping motor can be designed with sixteen stator teeth and two fingers per stator tooth in order to satisfy the alignment requirement of stator tooth fingers and rotor poles, as described above in paragraph [0075] et seq. In this design, there are fifteen spaces among the stator teeth at 21.0° and one at 45.0°. There are two big drawbacks with this design. One is the uneven peak unpowered and powered detent torques due to unequal spacing of stator teeth. The other is the waste of stator winding room at the location of 45.0° tooth spacing. Adding an extra stator tooth at the location with 45.0° tooth spacing, which makes the stator with seventeen teeth and sixteen spaces among the stator teeth at 21.0° and one at 24.0°, will improve the uneven peak unpowered and powered detent torques, but leave the extra stator tooth unused for windings. Therefore, the designs with the numbers of stator teeth that are not equally spaced, or are not integer-multiples of the number of phases, are not recommended. For example, the above four-phase, 3.0° per step, sixty-rotor pole, unipolar stepping motor can be designed with eight equally-spaced stator teeth with three fingers per stator tooth.

All of the above examples and Equations 3, 6 and 7 show that the distance between two neighboring fingers on a given stator tooth is such that when the fingers align with the rotor poles, they will align with poles of the same polarity. This means that the rotor pole of the opposite polarity will be skipped in between two neighboring fingers. However, tooth fingers can be designed (but are not recommended) without such pole skipping for the stepping motors disclosed herein. For example, the two-finger-per-stator-tooth design in FIG. 1 can be a three-finger-per-stator-tooth design with an additional finger in between the existing two fingers. This additional finger will align with the opposite rotor pole, as those aligned with the two fingers in FIG. 1. Similarly the three-finger-per-stator-tooth design in FIG. 4 can be a five-finger-per-stator-tooth design with two additional fingers. In comparison with the preferred embodiments disclosed herein, there are three drawbacks with such designs with additional fingers. First, very high unpowered detent torque is created due to magnetic short circuits among the rotor poles and stator tooth fingers. Second, very low powered detent and running torques are created due to magnetic flux cancellation among rotor poles and stator fingers. Third, and perhaps most importantly, the stepping motor may step irregularly in terms of step size due to the combination of very high unpowered detent torque and very low powered and running torques. Therefore, stator tooth fingers should not be spaced from one another so as to align with rotor poles of opposite polarity. Rather, they should be spaced so as to align with rotor poles of the same polarity.

Stepping motors with five or more phases, although possible as listed in Table 1 for five-phase rotor poles, are not illustrated herein because they are rarely used due to the high cost of motor drivers when compared to the commonly used two-, three-, or four-phase motor drivers.

A linear stepping motor that utilizes the design concepts of this invention is a special case. By opening up a stepping motor and straightening the stator and rotor, a rotational stepping motor becomes a linear stepping motor. However, linear stepping motors are not illustrated herein because the fact that the alignment among stator tooth fingers and rotor poles, electrical wiring diagrams, and excitation polarity sequences remain the same as those disclosed herein for rotational stepping motors. The alignment among stator tooth fingers and rotor poles, electrical wiring diagrams, and excitation polarity sequences are, respectively, shown in above: (a) para. [0067] et seq., FIG. 2B and Table 2 for three-phase bipolar stepping motor; (b) para. [0075] et seq., FIG. 5B and Table 3 for four-phase unipolar stepping motor; and (c) para. [0079] et seq., FIG. 6B and Table 4 for two-phase-bipolar stepping motor.

Several other variations of stepping motor designs based on the principles of this invention are not shown herein. These include: (a) sectional or fractional stepping motors, where only portions of the entire 360° stator and rotor are used; (b) stepping motors with reversed, rotational and stationary members, where the inner stationary member is a stator and the other rotational member is a rotor; (c) stepping motors with axial air gap(s), where the rotor and the stator, both in planar forms, are aligned side by side on a common axis. In comparison with the circular and radial air gaps in the First through Eighth forms, the axial air gap designs require axial magnetization directions for the rotor poles instead of radial directions in the First through Eighth forms, and the stator teeth and fingers arranged to face toward the rotor poles in the axial directions. In these design variations, the winding schemes and the alignment of stator tooth fingers and rotor poles will remain the same as those discussed above for two-, three- and four-phase motors.

Bifilar windings and redundant windings are yet other features that can be easily implemented for all the above winding schemes. They are not illustrated herein because they are common winding techniques and minor variations of the winding schemes disclosed above.

Use of solid soft magnetic steel(s), to fabricate one-piece solid stator stack with teeth, or even to fabricate one-piece solid stator housings and teeth, is yet another feature that can be implemented for low stepping rate applications for the inventions disclosed herein. Solid soft magnetic steels may include, but are not limited to, molded iron-powder composite materials, low carbon steels (such as American Iron and Steel Institute (AISI) designated 1010, 1015, or 1018 steel, etc.), solid martensitic corrosion-resistant steels (such as 416 stainless steel, etc.), or solid high-permeability nickel-iron or iron-cobalt alloys, etc. Those solid soft magnetic steels are distinguished from the commonly used electrical steel lamination materials (e.g., AISI M-15, M-19, etc.), or high-permeability nickel-iron or iron-cobalt alloys, etc. for high-frequency magnetic circuit applications. Those solid soft magnetic steels are known to magnetic designers for low frequency applications where eddy currents and hysteresis losses are insignificant. This feature has proven to be extremely useful for low stepping rate motors and actuators, because it eliminates de-lamination problems, cuts down costs (specially when using common 1018 low-carbon steel or 416 stainless steel), and simplifies fabrication processes.

Based on the description above, the main difference between this invention and the prior art (see, e.g., U.S. Pat. Nos. 4,190,779 and 4,315,171, supra) is in the stator designs and can be summarized as follows: (a) the stator teeth in this invention are equally spaced, whereas the stator teeth in the prior art were grouped in segments and the segments were spaced apart by the normal stator tooth spacing and an additional angle, typically, one step angle; (b) with equal spacing of stator teeth, the stepping motor produces more constant peak unpowered detent torque and powered detent torques, than those in the prior art; (c) this invention uses fingers on the stator teeth, while the prior art does not; (d) this invention uses fewer stator teeth than those required in the prior art for small stepping angles; (e) with fewer stator teeth, the design of the present invention has more room for increasing the number of turns per phase, or reducing the phase resistance with thick gage wire for windings, while maintaining the number of turns per phase, and, therefore, increasing the motor torque or torque density; (f) with more room in the stator, the stator teeth in this invention can be thicker, therefore stronger, than those in the prior art, improving step stability, accuracy and manufacturability; (g) with fewer stator teeth, the stator mass of the design per this invention will be less than that of prior art, and (h) with fewer stator teeth and equal spacing of teeth, the windings process will be easier than what it takes for the prior art.

Another difference between this invention and the prior art is the rotor support design with deep and wider slots to reduce the magnetic strength variations among rotor magnets in order to build more-constant peak unpowered and powered detent and peak running torques.

Additionally, this work has established the relationships, Equations 1, 2 and 3, supra, among rotor pole, stator tooth and finger, step angle, phase, and bipolar or unipolar driver configurations. It has demonstrated the winding schemes for two-, three- and four-phases, with three-, four-, five-, six- or eight-leadwire stepping motors and driving polarity sequences that are common to other commercial type stepping motors and bipolar or unipolar motor drivers for the variable reluctance-type, the hybrid-type, and the permanent magnet-type.

Therefore, while a number of embodiments of the improved stepping motors have been shown and described, and certain changes and modifications thereto discussed, persons skilled in this art will readily appreciate that various additional changes and modifications may be made without departing from the spirit of the invention, as defined and differentiated by the following claims.

What is claimed is:

1. A permanent magnet-type stepping motor having a motor driver, a movable member and a stationary member, comprising:
    a number of circumferentially spaced magnetic poles on a surface of one of said members, with adjacent poles being of opposite polarity, the number of poles being a function of a constant, the number of phases and a desired step interval;
    said magnetic poles having a separation region between adjacent magnetic poles;
    a number of equally-spaced teeth on the other of said members, said teeth being arranged to face toward said one member surface, each of said teeth having a plurality of circumferentially spaced fingers arranged to face toward said one member surface, the number of said teeth being a whole integer that is a function of a constant, the number of said poles, the number of fingers on each stator tooth, and the number of phases;
    wherein said fingers are spaced from one another such that the fingers on any given tooth will align with poles of the same polarity;
    wherein said one member is a rotor having an outer surface, said other member is a stator, said desired step interval is a desired step angle, and said teeth are spaced circularly about said stator to face toward said rotor outer surface;
    wherein the number of said rotor poles is an even integer determined from the equation:

$$\text{step angle} = \frac{(\text{drive number}) \times 360°}{(\text{no. of phases}) \times (\text{no. of rotor poles})}$$

where the drive number is 1 for a bipolar drive and 2 for a unipolar drive; and
    wherein the maximum number of stator teeth (m) per phase is determined by the equation:

$$m \leq \text{int}\left(\frac{\text{no. of rotor poles}}{[2 \times (\text{no. of fingers per stator tooth}) - 1] \times (\text{no. of phases})}\right),$$

where the expression, int(x), is the integer function that returns the integer portion of its argument (x).

2. A permanent magnet-type stepping motor as set forth in claim 1 wherein said rotor comprises solid soft magnetic steels, or is laminated with electrical steel laminations.

3. A permanent magnet-type stepping motor as set forth in claim 1 wherein said teeth are spaced equally about said stator.

4. A permanent magnet-type stepping motor as set forth in claim 1 and having two phases A and B, and wherein said rotor and stator are configured and arranged such that when the phase A fingers on the stator teeth align with the rotor poles, each phase B finger will align with the center of two neighboring rotor poles.

5. A permanent magnet-type stepping motor as set forth in claim 1 and having three phases A, B, and C, and wherein said rotor and stator are configured and arranged such that when the phase A stator fingers align with the rotor poles of one polarity, each phase B and phase C stator finger will align with rotor poles of the opposite polarity.

6. A permanent magnet-type stepping motor as set forth in claim 5 wherein if each phase B stator finger aligns with the leading edge of an associated rotor pole, each phase C finger aligns with the trailing edge of an associated rotor pole.

7. A permanent magnet-type stepping motor as set forth in claim 5 wherein if each phase B stator finger aligns with the trailing edge of an associated rotor pole, each phase C finger aligns with the leading edge of an associated rotor pole.

8. A permanent magnet-type stepping motor as set forth in claim 1 wherein said rotor and stator are configured and arranged such that for a four-phase motor having phases A, B, C and D, when the phase A fingers on the stator teeth align with the rotor poles, each phase B finger will align with the center of two neighboring poles, each phase C finger will align with a pole opposite to those aligned with phase A, and each phase D finger will align with a pole opposite those aligned with phase B.

9. A permanent magnet-type stepping motor as set forth in claim 1 wherein the number of poles is 80.

10. A permanent magnet-type stepping motor as set forth in claim 1 wherein the number of poles is 120.

11. A permanent magnet-type stepping motor as set forth in claim 1 wherein the number of said fingers on each said tooth is two.

12. A permanent magnet-type stepping motor as set forth in claim 1 wherein the number of said fingers on each said tooth is three.

13. A permanent magnet-type stepping motor as set forth in claim 1 wherein the number of said fingers on each said tooth is four.

14. A permanent magnet-type stepping motor as set forth in claim 1 wherein said separation region comprises an air gap.

15. A permanent magnet-type stepping motor as set forth in claim 1 wherein said separation region comprises soft magnetic steel or steel laminations.

\* \* \* \* \*